US009553404B2

(12) United States Patent
Simpson et al.

(10) Patent No.: US 9,553,404 B2
(45) Date of Patent: Jan. 24, 2017

(54) GUIDE PINS FOR CONNECTOR ASSEMBLIES

(71) Applicant: Tyco Electronics Corporation, Berwyn, PA (US)

(72) Inventors: Jeffrey Stewart Simpson, Mechanicsburg, PA (US); Robbie Tan, Mount Joy, PA (US)

(73) Assignee: TYCO ELECTRONICS CORPORATION, Berwyn, PA (US)

( * ) Notice: Subject to any disclaimer, the term of this patent is extended or adjusted under 35 U.S.C. 154(b) by 57 days.

(21) Appl. No.: 14/316,141

(22) Filed: Jun. 26, 2014

(65) Prior Publication Data

US 2015/0380867 A1 Dec. 31, 2015

(51) Int. Cl.
*F16B 23/00* (2006.01)
*H01R 13/631* (2006.01)
*H01R 9/03* (2006.01)

(52) U.S. Cl.
CPC ............ *H01R 13/631* (2013.01); *H01R 9/035* (2013.01); *H01R 2201/04* (2013.01)

(58) Field of Classification Search
CPC .... H01R 13/631; H01R 13/629; H01R 13/642
USPC .................... 411/401–407; 439/37, 377, 378
See application file for complete search history.

(56) References Cited

U.S. PATENT DOCUMENTS

| | | | | | |
|---|---|---|---|---|---|
| 2,443 | A * | 2/1842 | Morris | C21D 7/12 89/14.7 |
| 610,423 | A * | 9/1898 | Ommeren | F16B 23/0061 411/405 |
| 4,842,506 | A * | 6/1989 | Coutier | B29C 45/1743 425/193 |
| 5,113,686 | A * | 5/1992 | Kawahara | B21D 37/14 100/918 |
| 5,297,176 | A * | 3/1994 | Altman | G21O 5/06 376/364 |
| 5,391,091 | A * | 2/1995 | Nations | H01R 12/7047 439/359 |
| 5,490,190 | A * | 2/1996 | Hopkins | G21O 5/06 376/364 |
| 5,743,510 | A * | 4/1998 | Johnston | B28B 7/0014 249/155 |
| 5,775,931 | A * | 7/1998 | Jones | H01R 13/631 439/358 |
| 6,074,236 | A | 6/2000 | Wu | |
| 6,945,810 | B1 * | 9/2005 | Morana | H01R 12/7005 439/378 |
| 7,621,754 | B2 * | 11/2009 | Costello | H01R 13/7031 439/378 |
| 8,051,958 | B1 * | 11/2011 | Rockwell | F16D 55/22655 188/73.45 |

(Continued)

*Primary Examiner* — Gary Estremsky

(57) ABSTRACT

A guide pin for a connector assembly includes a guide pin body extending along a pin axis. The guide pin body has a stem extending between a root and a tip. The root has threads configured to be threadably coupled to a support frame of the connector assembly and the tip has a lead-in to guide the guide pin body into a mounting block. The stem has slots extending parallel to the pin axis from the tip to an intermediate position along the guide pin body remote from the tip. The slots are configured to receive ribs of a driver tool used to rotate the guide pin body to threadably couple the root to the support frame.

18 Claims, 8 Drawing Sheets

(56) References Cited

U.S. PATENT DOCUMENTS

| | | | | |
|---|---|---|---|---|
| 8,617,225 | B2 * | 12/2013 | McShane | A61B 17/7083<br>411/402 |
| 8,979,459 | B2 * | 3/2015 | Baumler | B23G 9/001<br>411/389 |
| 2008/0220629 | A1 * | 9/2008 | Hamner | H05K 7/1084<br>439/73 |

* cited by examiner

GUIDE PINS FOR CONNECTOR ASSEMBLIES

BACKGROUND OF THE INVENTION

The subject matter herein relates generally to guide pins for connector assemblies.

Guide pins are used during mating of electrical connector assemblies. For example, in communication systems, such as network systems, servers, data centers, and the like, large printed circuit boards, known as backplanes, are used to interconnect midplanes, daughtercards, line cards and/or switch cards. The communication systems use high speed differential connectors mounted to the backplane and high speed differential connectors mounted to the line cards and switch cards to transmit signals therebetween. The guide pins are used to align the mating interfaces of the connector assemblies.

However, with some systems, the connector assemblies are held within enclosures, such as cable trays that hold the cables interconnecting the various connectors. The guide pins associated with such connector assemblies may be difficult to access with an installation tool for installing the guide pin in the connector assembly. For example, the sides of the guide pin may be blocked such that the installation tool is unable to access the guide pin from the side. The guide pins may only be accessible from the front. Installation of the guide pins in such situations is difficult.

A need remains for a guide pin that may be assembled and installed by a tool accessing the guide pin from the front of the guide pin.

BRIEF DESCRIPTION OF THE INVENTION

In one embodiment, a guide pin for a connector assembly is provided that includes a guide pin body extending along a pin axis. The guide pin body has a stem extending between a root and a tip. The root has threads configured to be threadably coupled to a support frame of the connector assembly and the tip has a lead-in to guide the guide pin body into a mounting block. The stem has slots extending parallel to the pin axis from the tip to an intermediate position along the guide pin body remote from the tip. The slots are configured to receive ribs of a driver tool used to rotate the guide pin body to threadably couple the root to the support frame.

Optionally, the slots may have a bottom wall and side walls generally perpendicular to the bottom wall. The bottom wall may be co-planar with the corresponding flat side. The side walls may define bearing surfaces for the driver tool to rotate the guide pin. The side walls and bottom wall may be recessed below an outer surface of the guide pin body. The stem may be generally cylindrical having a stem diameter. The bottom walls may be separated by a distance less than the stem diameter. The flat sides may be separated by a distance less than the stem diameter.

Optionally, the slots may extend at least partially along the tip. The stem may include radiused portions aligned with the slots. The radiused portions may be configured to engage the mounting block. The slots may be chamfered to guide the ribs of the driver tool into the slots.

Optionally, the tip may be cone shaped and the stem may be cylindrical shaped with the flat sides and slots recessed into an outer surface of the stem. The slots may be open at a front of the guide pin body.

In another embodiment, a connector assembly is provided that includes a support frame having a cavity and a threaded bore. At least one connector is received in the cavity. A guide pin is coupled to the support frame. The guide pin has a guide pin body extending along a pin axis. The guide pin body has a stem extending between a root and a tip. The root has threads threadably coupled to the threaded bore of the support frame and the tip has a lead-in to guide the guide pin body into a mounting block. The stem has slots extending from the tip parallel to the pin axis. The slots are configured to receive ribs of a driver tool used to rotate the guide pin body to threadably couple the root to the threaded bore.

In a further embodiment, a cable backplane system is provided including a backplane having a plurality of openings therethrough. The backplane has mounting blocks proximate the openings. A cable rack is coupled to a rear of the backplane. The cable rack includes a tray having frame walls surrounding a raceway and cable connector assemblies supported by corresponding frame walls. Each cable connector assembly has a support frame defining a cavity. The support frame has spacers with threaded bores. Each cable connector assembly has at least one cable connector received in the cavity. Each cable connector has a plurality of cables extending therefrom into the raceway. Each cable connector is received in a corresponding opening in the backplane and held in position relative to the backplane by the support frame. A plurality of guide pins is coupled to corresponding spacers. Each guide pin has a guide pin body extending along a pin axis. The guide pin body has a stem extending between a root and a tip. The root has threads threadably coupled to the corresponding threaded bore. The tip has a lead-in to guide the guide pin body into the mounting block. The stem has slots extending from the tip parallel to the pin axis. The slots are configured to receive ribs of a driver tool used to rotate the guide pin body to threadably couple the root to the threaded bore.

DETAILED DESCRIPTION OF THE INVENTION

Figure 1:
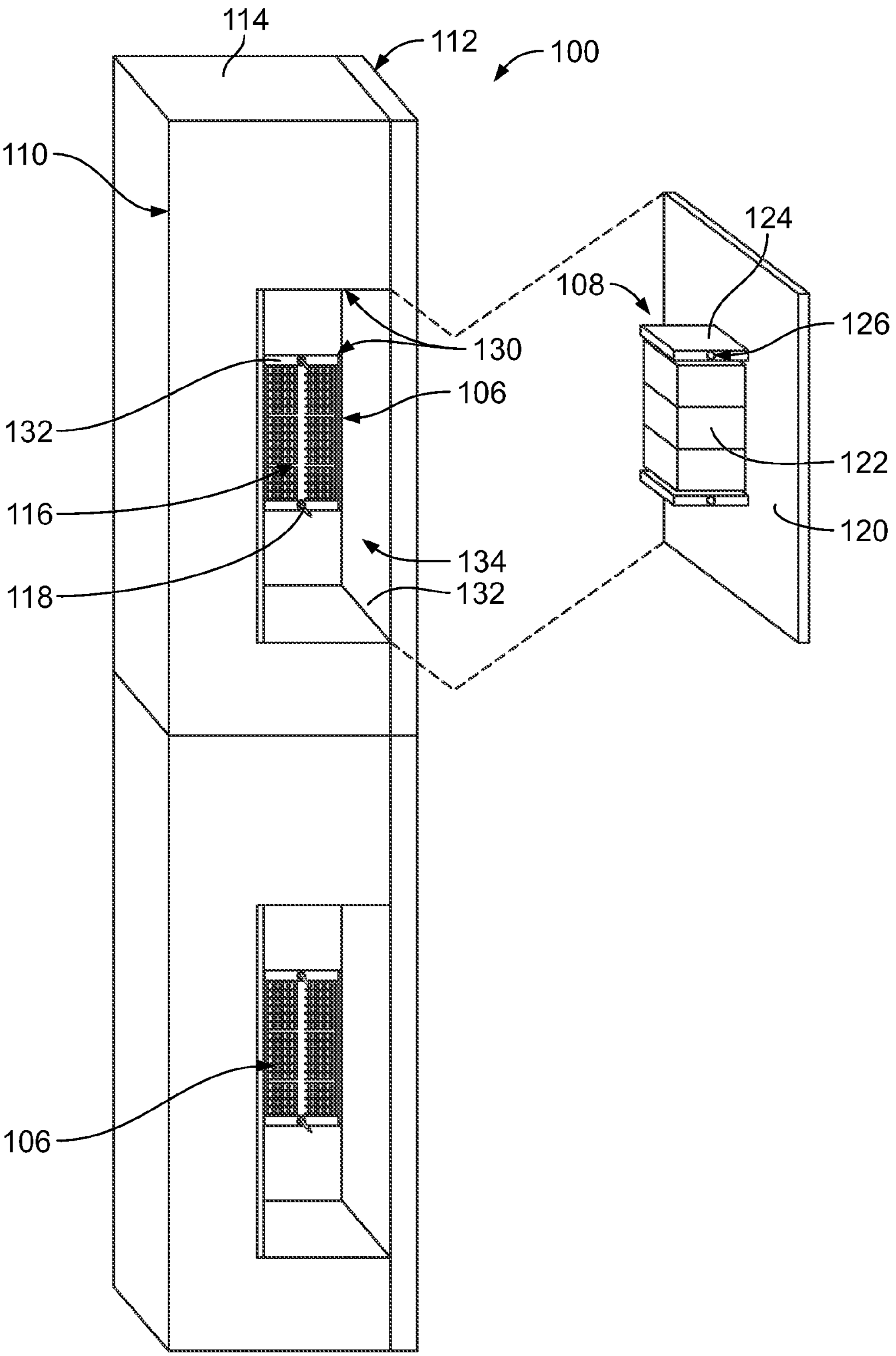
FIG. 1 is a front perspective view of a connector system formed in accordance with an exemplary embodiment.

FIG. 1 is a front perspective view of a connector system 100 formed in accordance with an exemplary embodiment. The connector system 100 may be used in a data communication application, such as a network switch. The connector system 100 may be used as part of a backplane system, such as a cable backplane system, and thus may be referred to hereinafter as a backplane system 100 or a cable backplane system 100. The connector system 100 may be electrically connected to a mating connector assembly 108, such as a line card, a switch card, another type of mating connector mounted to a circuit board or another type of mating connector assembly.

The connector system 100 includes one or more connector assemblies 106 that are mounted to a panel 110. In an exemplary embodiment, the connector assemblies 106 are cable connector assemblies having a plurality of electrical cables 152 (shown in FIG. 2) associated therewith, and thus may be referred to hereinafter as cable connector assemblies 106. In alternative embodiments, rather than being cable connector assemblies, the connector assemblies may be terminated to circuit boards, such as a backplane.

Optionally, the panel 110 may be, or include, an enclosure that surrounds portions of the cable connector assemblies 106. The panel 110 may receive a portion of the mating connector assembly in the enclosure. The panel 110 supports the components of the connector assemblies 106. The panel 110 may include a chassis, a rack, a cabinet or other suitable structures for holding the components and for mating with the mating connector assemblies 108. The panel 110 may include structures for guiding, supporting and/or securing the mating connector assemblies 108 coupled to the connector assemblies 106.

In an exemplary embodiment, the panel 110 includes a cable rack 112 that supports and/or manages the cables 152 of the cable connector assemblies 106. The cable rack 112 includes one or more trays 114 that are held together and extend along different portions of the cable backplane system 100. The trays 114 may be box-shaped and define raceways for the cables 152. The cable rack 112 supports one or more connector assemblies 106.

The tray 114 includes a frame 130 surrounding a raceway through which the cables 152 (shown in FIG. 2) are routed. The frame 130 includes frame walls 132 defining the cavity forming the raceway. In an exemplary embodiment, the frame walls 132 are one or more sheet metal pieces that are stamped, formed and may be coupled together using fasteners or other connecting means. The frame walls 132 may form a connector cavity 134 that receives the mating connector assembly 108 therein.

Each connector assembly 106 includes one or more connectors 116, which may be interconnected by cables or by a circuit board, within the connector system 100. When embodied as cable connectors 116, the cable connector assemblies 106 eliminate interconnections via traces of a circuit board, such as a backplane circuit board, and instead interconnect various cable connectors 116 with cables. The cable connector assemblies 106 may improve signal performance along the signal paths between various connectors of the cable backplane system 100 as compared to conventional backplanes. For example, the cable connector assemblies 106 support higher speeds, longer signal path lengths and lower cost per channel as compared to conventional backplanes. The connector assemblies 106 may provide shielding of signal lines for improved signal performance. The connector assemblies 106 may be packaged in a structure that allows accurate connector 116 location for mating with the corresponding mating connector assemblies 108. For example, the connector assemblies 106 include guide pins 118 that are used to locate the connectors and corresponding mating connector assemblies 108 during mating. The guide pins 118 are able to be installed and/or removed easily, even when the connectors 116 are installed in the panel 110 and access is restricted.

The mating connector assembly 108 includes a circuit board 120 and a plurality of mating connectors 122 mounted thereto. The mating connector assembly 108 includes mounting blocks 124 having openings 126 that receive the guide pins 118. The guide pins 118 guide mating of the mating connector assembly 108 and the connector assemblies 106.

Figure 2:
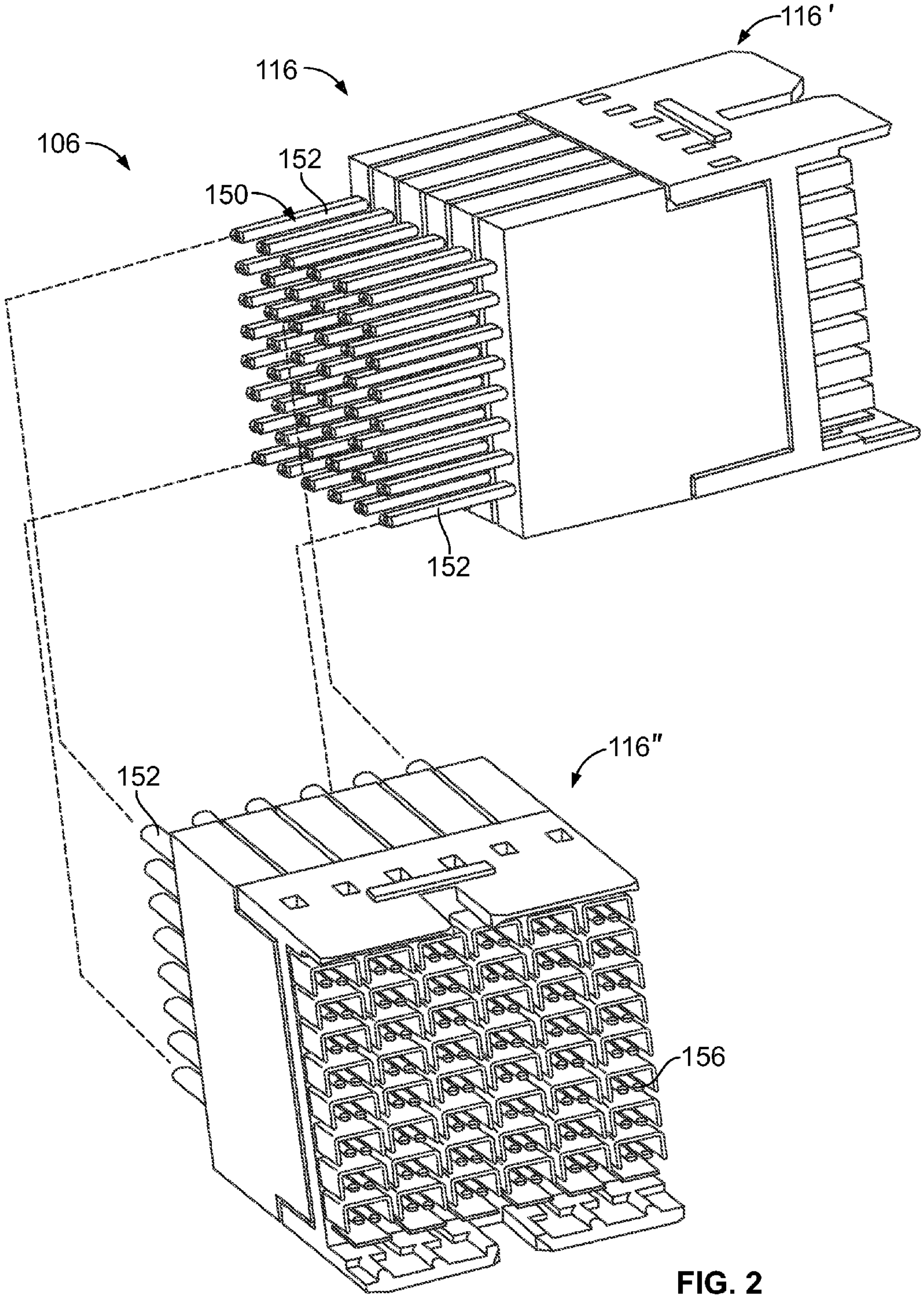
FIG. 2 illustrates cable connectors of the connector system formed in accordance with an exemplary embodiment.

FIG. 2 illustrates a portion of the cable connector assembly 106 formed in accordance with an exemplary embodiment. The cable connector assembly 106 includes a plurality of the cable connectors 116, which may be referred to hereinafter as first and second cable connectors 116', 116", and a cable bundle 150 between the cable connectors 116. The cable connectors 116 are provided at ends of the cable bundle 150. The cable bundle 150 includes a plurality of cables 152. Optionally, the cable connectors 116 may be identical to one another. The cable connectors 116 may define header connectors. In an exemplary embodiment, the cable connector 116 is a high speed differential pair cable connector that includes a plurality of differential pairs of conductors, such as signal contacts 156, mated at a common mating interface. The differential conductors are shielded along the signal paths thereof to reduce noise, crosstalk and other interference along the signal paths of the differential pairs.

Figure 3:
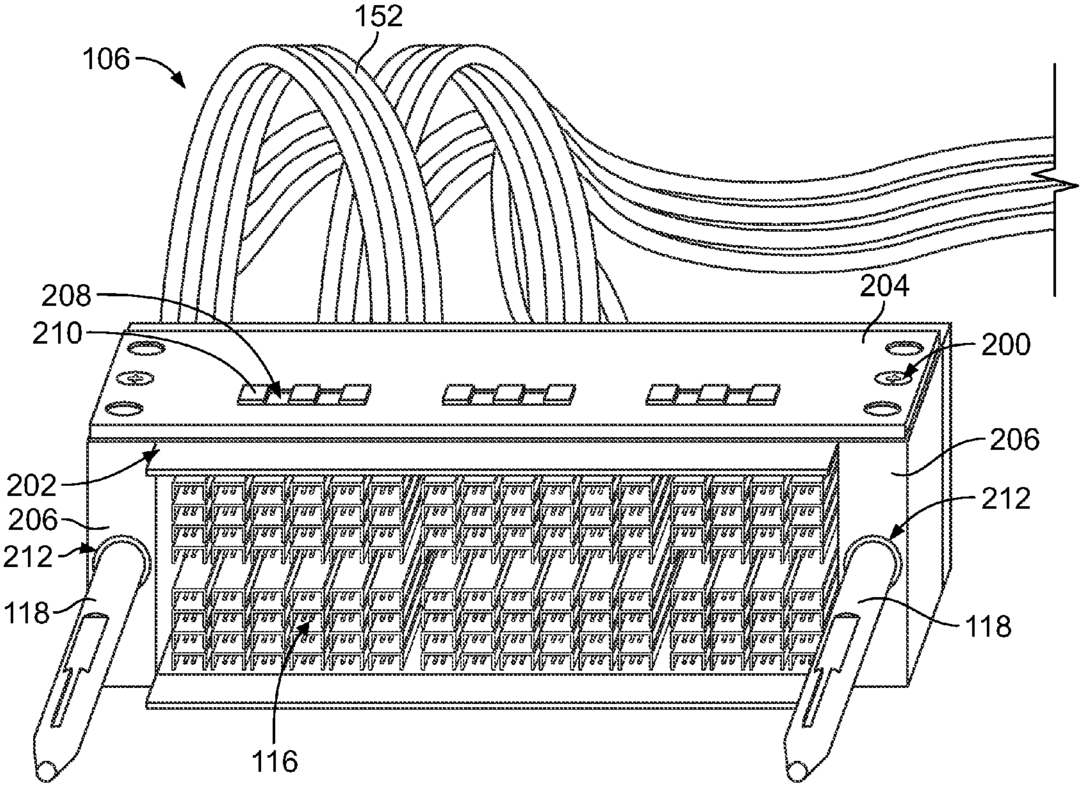
FIG. 3 is a front perspective view of a connector assembly of the connector system.

FIG. 3 is a front perspective view of the connector assembly 106 showing the connectors 116 and associated cables 152. The connector assembly 106 includes a support frame 200 defining a cavity 202. The cable connectors 116 are positioned in the cavity 202. Any number of cable connectors 116 may be held in the cavity 202, including a single cable connector 116 or multiple cable connectors 116 as in the illustrated embodiment.

The support frame 200 includes side walls 204 and spacers 206 between the side walls 204. The cavity 202 is defined between the side walls 204 and between the spacers 206. In an exemplary embodiment, the side walls 204 include slots 208 that receive lugs 210 extending from the housings of the cable connectors 116. The slots 208 may be oversized to allow a limited amount of floating movement of the cable connectors 116 relative to the support frame 200, such as to allow the cable connectors 116 a range of movement for aligning with the mating connectors of the mating connector assembly 108 (shown in FIG. 1) during mating.

The guide pins 118 are coupled to each of the spacers 206 and extend forward from the spacers 206. In an exemplary embodiment, the guide pins 118 are removably coupled to the spacers 206, such as by a threaded connection therebetween. The spacers 206 include threaded bores 212 and the guide pins 118 are threadably coupled to the threaded bores 212. In an exemplary embodiment, the guide pins 118 are configured to be accessed by a driver tool from the front of the guide pins 118, as will be described in further detail below.

Figure 6:
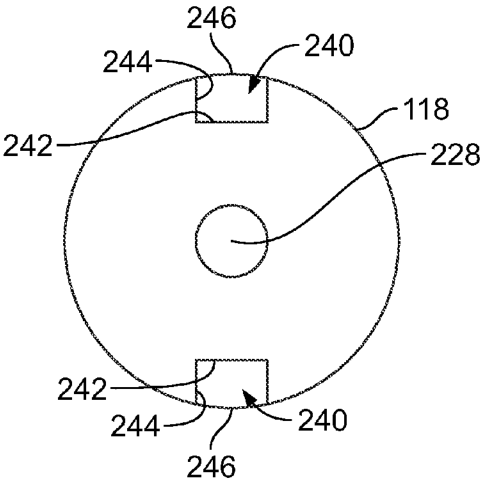
FIG. 6 is a front view of the guide pin.
Figure 4:
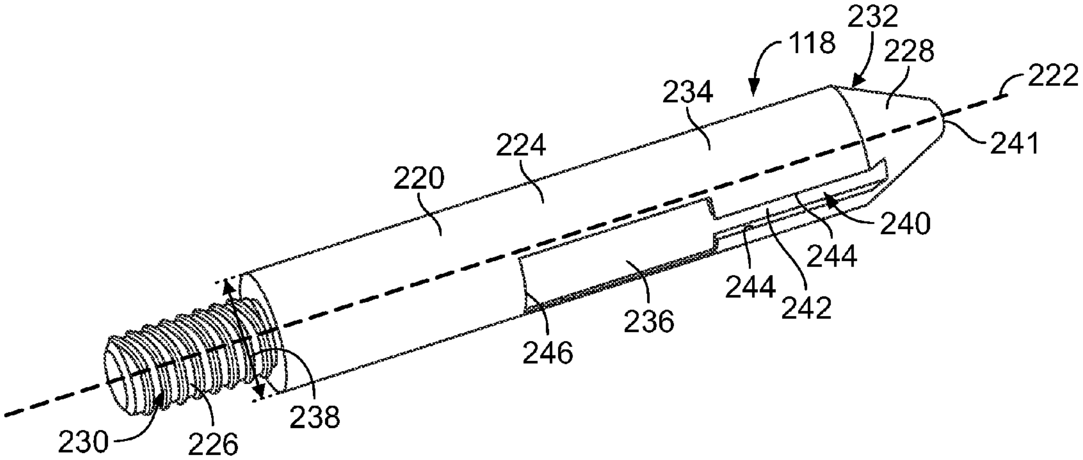
FIG. 4 is a perspective view of a guide pin of the connector assembly and formed in accordance with an exemplary embodiment.
Figure 5:
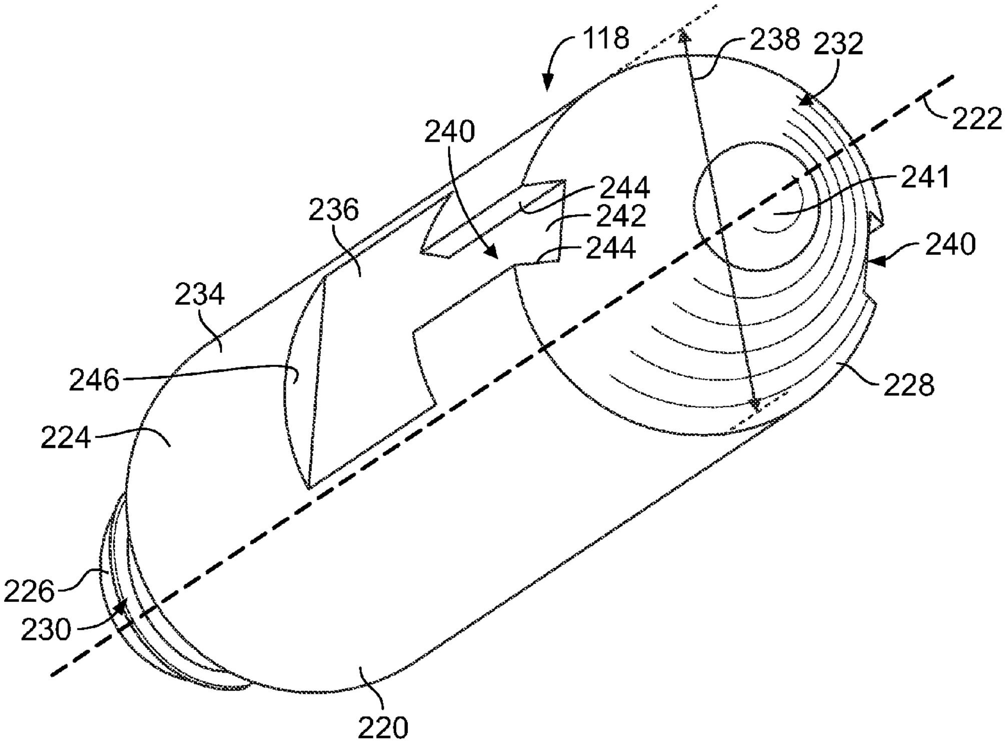
FIG. 5 is a perspective view of the guide pin.

FIGS. 4 and 5 are perspective views of the guide pin 118. FIG. 6 is a front view of the guide pin 118. The guide pin 118 includes a guide pin body 220 extending along a pin axis 222. The guide pin body 220 has a stem 224 extending between a root 226 and a tip 228. The root 226 has threads 230 configured to be threadably coupled to the support frame 200 (shown in FIG. 3), such as into the threaded bores 212 (shown in FIG. 3) of the connector assembly 106 (shown in FIG. 3). The tip 228 has a lead-in 232 to guide the guide pin body 220 into the mounting block 124 (shown in FIG. 1). For example, the tip 228 may be cone-shaped.

The stem 224 is cylindrical shaped and includes an outer surface 234. The stem 224 has at least two flat sides 236 formed in the outer surface 234 that are located remote from the tip 228. The flat sides 236 define surfaces that may be held by an installation tool, such as a wrench, that is used to hold the guide pin 118 and rotate the guide pin 118, such as to threadably drive the guide pin 118 into the threaded bore 212. The flat sides 236 are recessed into the stem 224 such that the flat sides 236 are contained within a stem diameter 238 of the outer surface 234 of the stem 224.

The stem 224 has slots 240 formed in the outer surface 234. The slots 240 extend parallel to the pin axis 222 from the tip 228 to the flat sides 236, which are remote from the tip 228. In alternative embodiments, the guide pin 118 may be provided without the flat sides 236. In such embodiments the slots 240 extend parallel to the pin axis 222 from the tip 228 to an intermediate position along the guide pin body 220 remote from the tip 228. The slots 240 are configured to receive ribs of a driver tool 260 (shown in FIG. 7) used to rotate the guide pin body 220. The slots 240 are open at a front 241 of the guide pin body 220, such as to receive the driver tool 260 from a front loading position. Optionally, the slots 240 may extend at least partially along the tip 228. For example, the slots 240 may be formed in the tip 228 in addition to being formed in the stem 224. The slots 240 are chamfered to guide the ribs of the driver tool into the slots.

Each slot 240 has a bottom wall 242 and side walls 244 generally perpendicular to the bottom wall 242. The bottom wall 242 is co-planar with the corresponding flat side 236. The side walls 244 define bearing surfaces for the driver tool 260 to rotate the guide pin 118. The side walls 244 and bottom wall 242 are recessed below the outer surface 234 of the guide pin body 220.

Because the slots 240 and flat sides 236 are formed into the stem 224 and recessed below the outer surface 234, the guide pin 118, in the areas of the slots 240 and flat sides 236, is thinner. For example, the opposite bottom walls 242 and opposite flat sides 236 are separated by a distance less than the stem diameter 238. Additionally, even though the side walls 244 extend outward from the bottom wall 242, the outer portion of the guide pin body 220 is removed, thus making the guide pin 118 thinner in such areas. When the guide pin 118 is received in the mounting block 124, the thinner areas of the guide pin 118 may allow the guide pin to shift slightly within the mounting block 124, which may cause slight misalignment of the connector assembly 106 with respect to the mating connector assembly 108. As such, the guide pins 118 may be designed with radiused portions 246 of the stem 224 that are positioned rearward of the slots 240, such as behind the slots 240 and behind the flat sides 236. The radiused portions 246 extend along a length of the guide pin 118 between the flat sides 236 and the root 226. At the radiused portions 246, the guide pin 118 has the full stem diameter 238. The guide pin 118 is designed such that the guide pin 118 is loaded into the mounting block 124 until the radiused portions 246 are received in the mounting block 124. The radiused portions 246 engage the mounting block 124 when assembled to properly align the guide pins 118 within the mounting blocks 124. The mounting blocks 124 may be deep enough to accommodate the entire guide pins 118, including the radiused portions 246, to ensure that the guide pins 118 are properly positioned in the mounting blocks 124.

Figure 7:
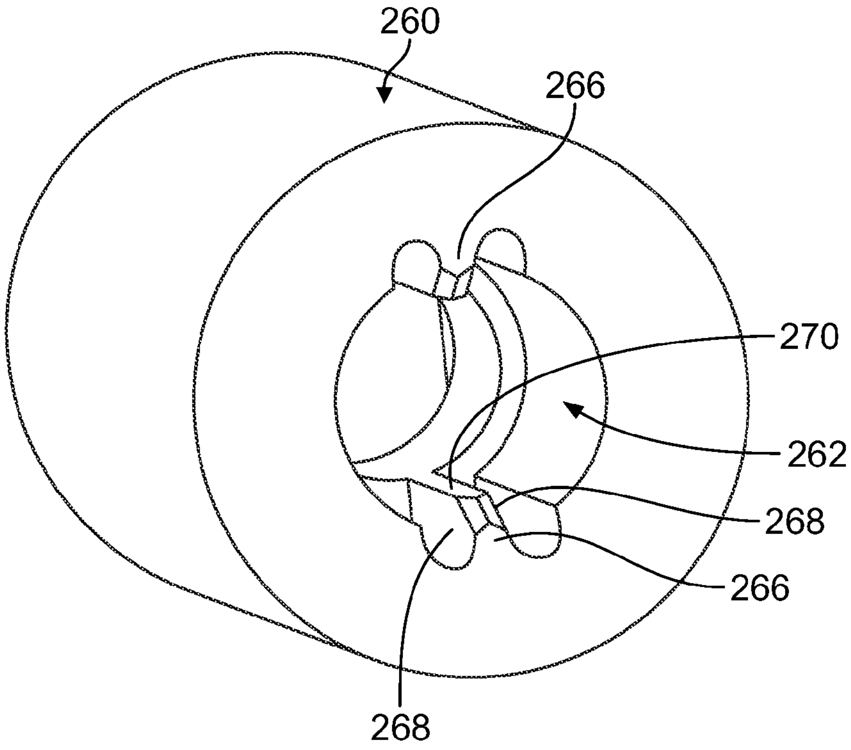
FIG. 7 is a front perspective view of a driver tool for installing the guide pin and formed in accordance with an exemplary embodiment.
Figure 8:
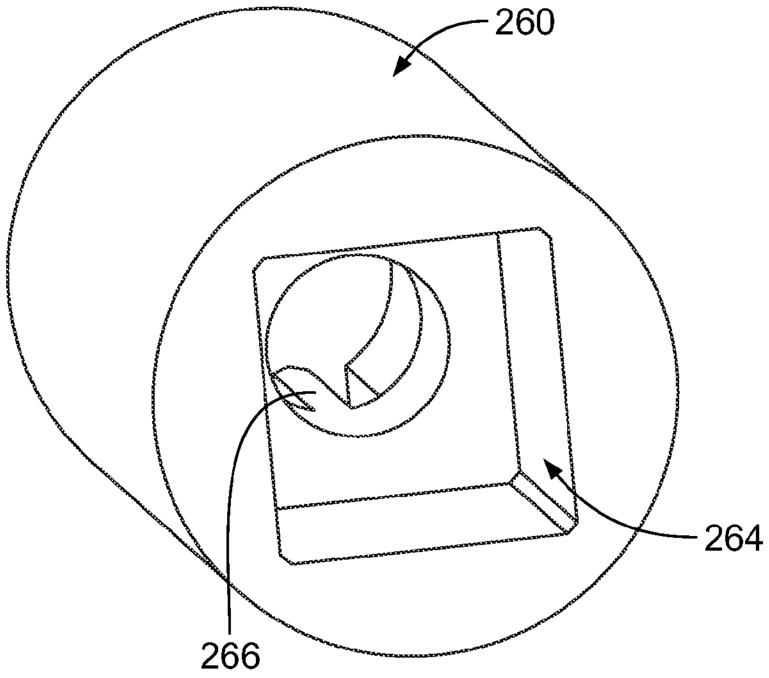
FIG. 8 is a rear perspective view of the driver tool.

FIGS. 7 and 8 are front and rear perspective views of the driver tool 260 in accordance with an exemplary embodiment. The driver tool 260 includes a front cavity 262 that receives the front 241 of the guide pin 118 (both shown in FIG. 4). The driver tool 260 includes a rear cavity 264 that receives a ratchet tool or other drive mechanism for the driver tool 260. Alternatively, the driver tool 260 may be integral with drive mechanism.

In an exemplary embodiment, the front cavity 262 is generally cylindrical; however the driver tool 260 includes ribs 266 extending into the cavity. The ribs 266 are configured to be received in the slots 240 (shown in FIG. 4) of the guide pin 118. In the illustrated embodiment, two ribs 266 are provided, however the driver tool 260 may include more than two ribs 266, such as when more than two slots 240 are provided in the guide pin 118. Each rib 266 has sides 268 and an end 270. The sides 268 may engage the side walls 244 (shown in FIG. 4) such that, when the driver tool 260 is rotated, the rotation of the driver tool 260 is transferred to the guide pin 118 to rotate the guide pin 118. The end 270 may engage the bottom wall 242 (shown in FIG. 4). Optionally, the front edge of each rib 266 may be chamfered to guide mating with the guide pin 118, such as to provide a lead-in into the slot 240.

Figure 9:
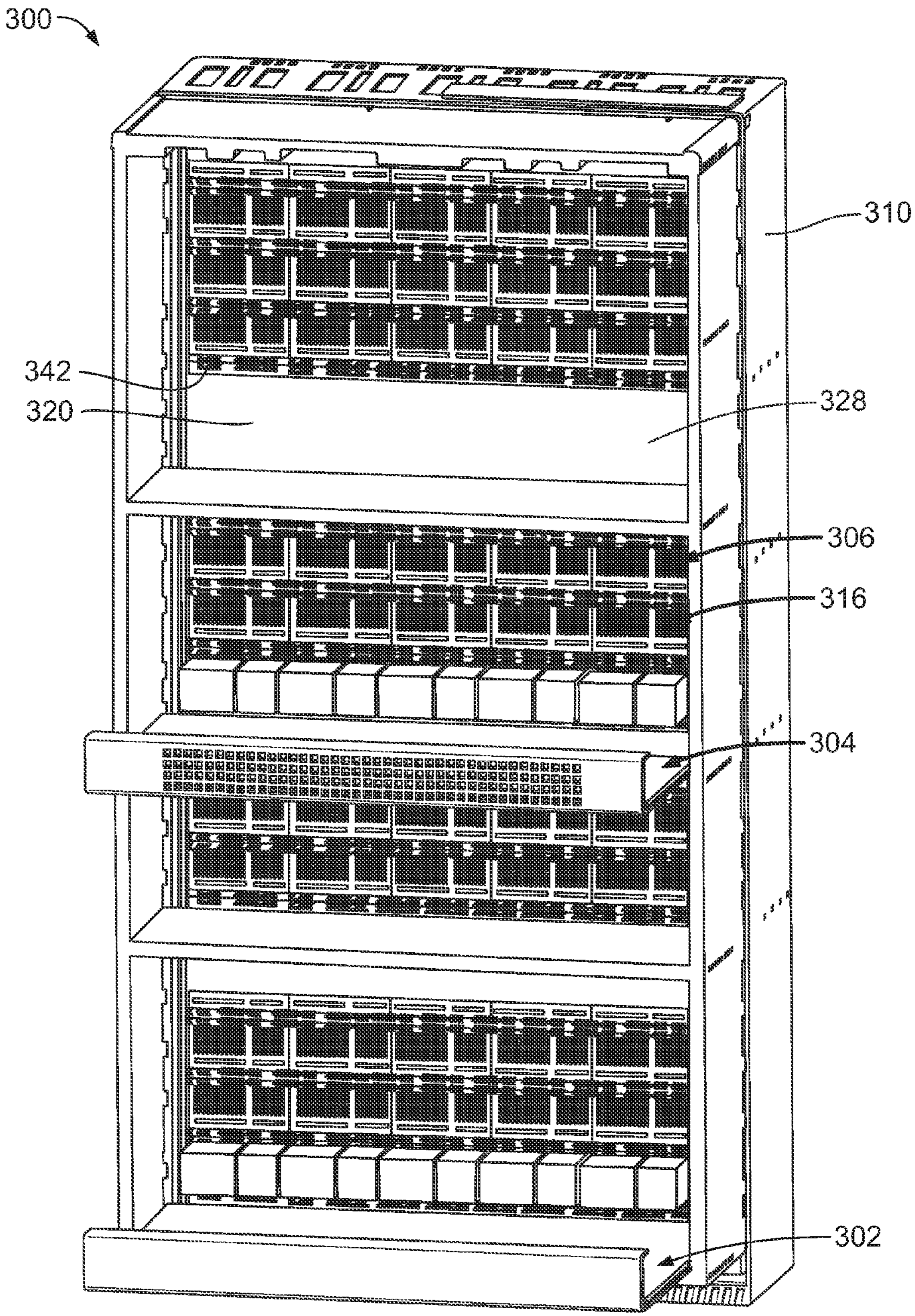
FIG. 9 is a front perspective view of a cable backplane system using the guide pins shown in FIG. 4 and formed in accordance with an exemplary embodiment.
Figure 10:
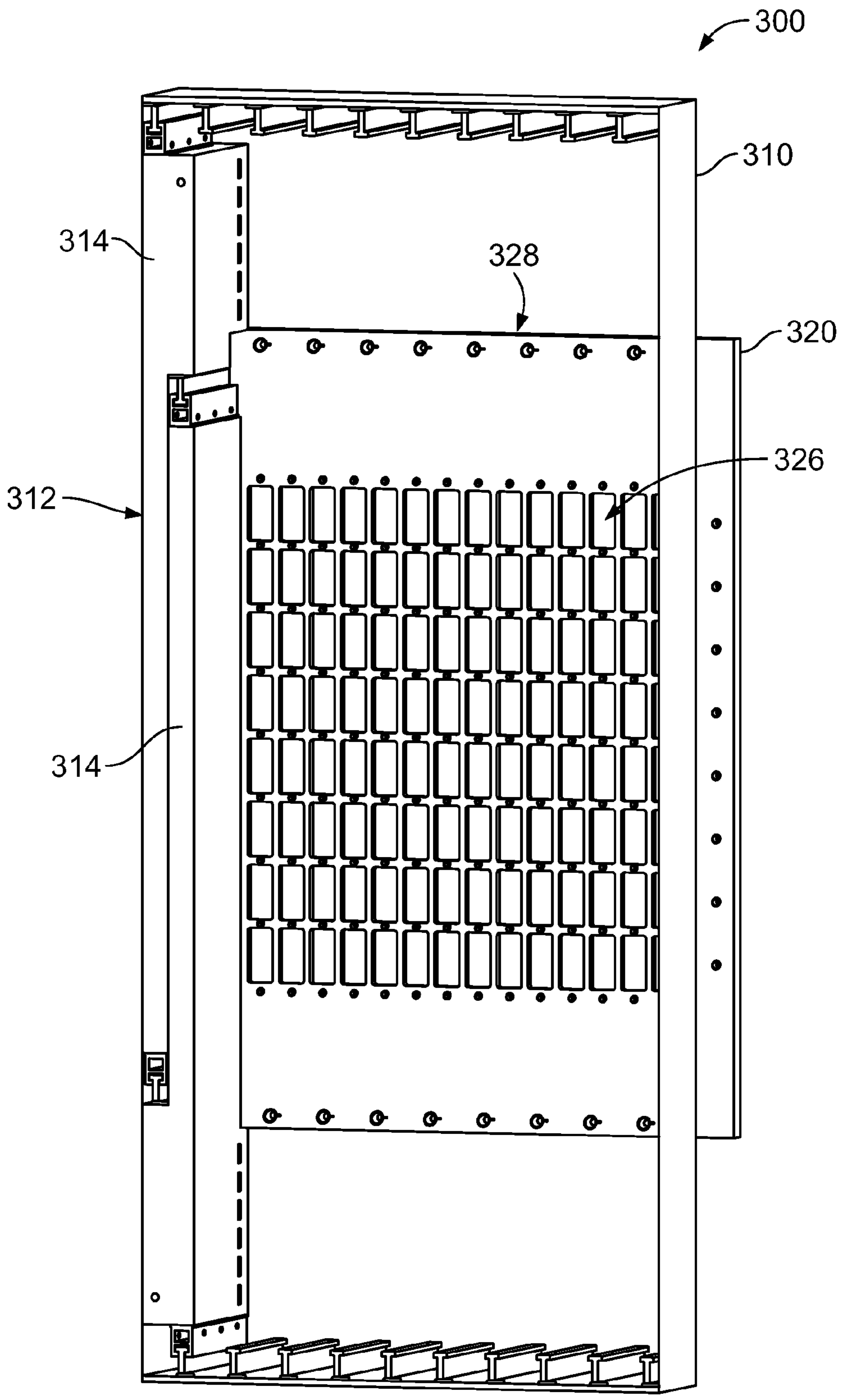
FIG. 10 is a rear perspective view of the cable backplane system shown in FIG. 9.

FIG. 9 is a front perspective view of a cable backplane system 300 formed in accordance with an exemplary embodiment. FIG. 10 is a rear perspective view of the cable backplane system 300. The cable backplane system 300 may be similar to the connector system 100 (shown in FIG. 1) in some aspects. The cable backplane system 300 uses the guide pins 118 to guide mating with corresponding mating connector assemblies. The cable backplane system 300 is used in a data communication application, such as a network switch. The cable backplane system 300 interconnects mating connector assemblies, such as line cards 302 and switch cards 304, using cable connector assemblies 306, which may be similar to the cable connector assemblies 106 (shown in FIG. 1). The cable backplane system 300 may be used to interconnect with other types of connectors and/or cards, such as daughtercards, in other embodiments. The cable connector assemblies 306 include cable connectors 316, which may be similar to the cable connectors 116 (shown in FIG. 1), that are interconnected by cables within the cable backplane system 300.

The cable backplane system 300 includes a chassis 310 that supports the components of the cable backplane system 300. The chassis 310 may include a rack, a cabinet or other suitable structures for holding the components of the cable backplane system 300. The chassis 310 may include structures for guiding, supporting and/or securing the mating connector assemblies 302, 304 coupled to the cable backplane system 300. For example, the guide pins 118 may be used for guiding, supporting and/or securing the cable connector assemblies 306 to the mating connector assemblies 302, 304. For example, the guide pins 118 may be received in openings in mounting blocks on the mating connector assemblies 302, 304.

The cable backplane system 300 includes a cable rack 312 (shown in FIG. 10) that supports and/or manages the cables of the cable connector assemblies 306. The cable rack 312 includes a plurality of trays 314 (shown in FIG. 10) that are held together and extend along different portions of the cable backplane system 300. The trays 314 may be box-shaped and define raceways for the cables. The cable rack 312 supports a plurality of the cable connectors 316 which form parts of the cable connector assemblies 306.

The cable backplane system 300 includes a backplane 320. The backplane 320 is coupled to and supported by the chassis 310. The trays 314 and cable connectors 316 are coupled to the backplane 320. The backplane 320 may be a circuit board and may be manufactured from typical circuit board material, such as FR-4 material. Electrical components, such as power supplies, fans, connectors, and the like may be attached to the backplane 320. Such electrical components may be electrically connected to traces or circuits of the backplane 320. The cable connectors 316 are not electrically connected to the backplane 320, as is typical of conventional backplanes, but rather the cable connectors 316 are interconnected by cables extending between the cable connectors 316. The backplane 320 may be manufactured from other materials in alternative embodiments, such as another dielectric material or a metal material, such as a metal sheet, such as when no electrical routing on the backplane 320 is required.

The backplane 320 and cable rack 312, with the cable connector assemblies 306, are coupled together to form the cable backplane system 300. The cable connectors 316 extend through openings 326 in the backplane 320 and are presented at a front 328 of the backplane 320 for mating with the mating connector assemblies 302, 304. In an exemplary embodiment, the cable connectors 316 are held in precise locations for mating with the line cards 302 and/or switch cards 304. In an exemplary embodiment, the guide pins 118 are used to align and position the cable connectors 316 with respect to the backplane 320 and/or the mating connector assemblies 302, 304. In an exemplary embodiment, because of the high density of the trays 314 and the limited access to the trays 314, the guide pins 118 and the areas surrounding the guide pins 118 may be inaccessible by a driver tool used to install the guide pins 118 to the cable connector assemblies 306. As such, a conventional wrench cannot be used to clamp from the sides of the guide pins 118 to install the guide pins 118 in the cable connector assemblies 306.

In an exemplary embodiment, the cable rack 312 is flexible to allow the cable connectors 316 to align with and pass through the openings 326. Optionally, portions of the trays 314 and/or the cable connectors 316 may pass through the openings 326. The trays 314 may float relative to each other and with respect to the backplane 320 to properly align the cable connectors 316 with the corresponding openings 326. The guide pins 118 are used for positioning the cable connector assembly 306 relative to the backplane 320 and/or the mating connector assemblies 302, 304. Once the trays 314 are coupled to the backplane 320, the backplane 320 may be used to hold the cable connectors 316 in precise locations for mating with the mating connector assemblies 302, 304. For example, the openings 326 may be used to control the final position of the cable connectors 316 for mating. In an exemplary embodiment, the cable connectors 316 float relative to one another and relative to the guide pins 118 to allow precise positioning of the cable connectors 316 relative to the backplane 320 for mating with the mating connector assemblies 302, 304.

In an exemplary embodiment, the backplane 320 holds a plurality of mounting blocks 342 (shown in FIG. 9), which may be metal blocks that extend across the front of the backplane 320 to stiffen the backplane 320. The guide pins 118 are received in openings in the mounting blocks 342.

Figure 11:
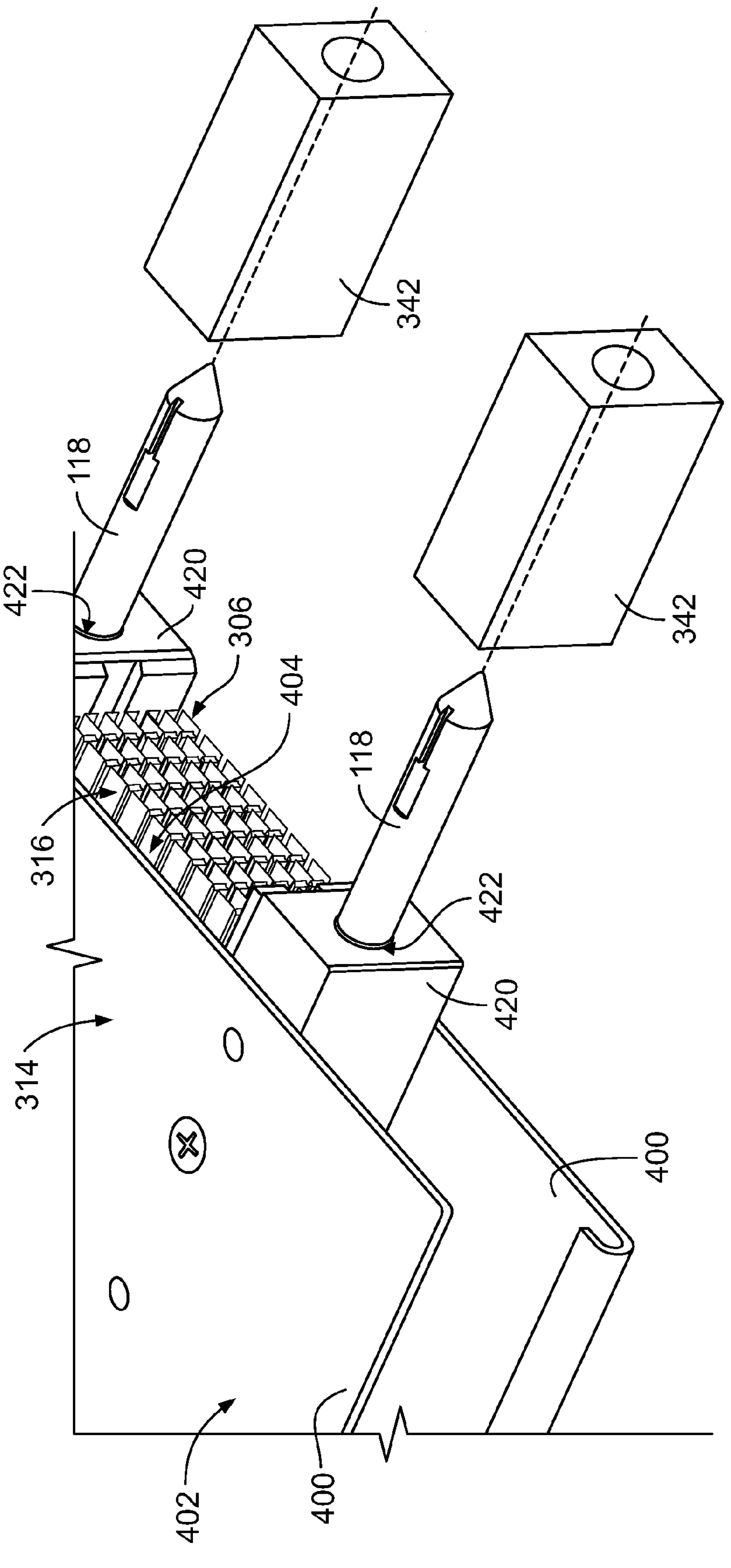
FIG. 11 is a perspective view of a portion of the cable backplane system shown in FIG. 9.

FIG. 11 is a perspective view of a portion of one of the trays 314 formed in accordance with an exemplary embodiment. The tray 314 includes frame walls 400 surrounding a raceway through which the cables of the cable connectors 316 are routed. The frame walls 400 may define a support frame 402 for the cable connector assemblies 306. The support frame 402 defines a cavity 404 that receives the cable connectors 316. The support frame 402 includes spacers 420 between the frame walls 400.

The spacers 420 hold the frame walls 400 at a predetermined distance from each other to define the cavity 404. The spacers 420 may be used to hold positions of the cable connectors 316. The guide pins 118 are coupled to the spacers 420. The guide pins 118 may be threadably coupled to the spacers 420 in a similar manner as described above. The spacers 420 include threaded bores 422 that receive the threaded portions of the guide pins 118. The threaded bores 422 define threaded bores of the support frame 402 that are used to hold the guide pins 118.

In an exemplary embodiment, the frame walls 400 are one or more sheet metal pieces that are stamped, formed and may be coupled together using fasteners or other connecting means. The sheet metal may be sufficiently thin to allow the frame walls 400 to have some flexibility for moving, twisting or otherwise manipulating the trays 314 into position relative to the backplane 320 (shown in FIG. 9) to position the cable connectors 316 in the openings 326 (shown in FIG. 9) in the backplane 320.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

What is claimed is:

1. A guide pin for a connector assembly comprising:

a guide pin body extending along a pin axis, the guide pin body having a stem extending between a root and a tip, the root having threads configured to be threadably coupled to a support frame of the connector assembly, the tip being pointed to provide a lead-in with an end of the tip being less than half of a diameter of the stem of the guide pin body to guide the guide pin body into a mounting block, the stem having slots extending parallel to the pin axis from the tip to an intermediate position along the guide pin body remote from the tip, the slots have a bottom wall and side walls generally perpendicular to the bottom wall, the bottom wall being recessed below an outer perimeter of the guide pin body, wherein the slots are configured to receive ribs of a driver tool used to rotate the guide pin body to threadably couple the root to the support frame.

2. The guide pin of claim 1, wherein the side walls define bearing surfaces for the driver tool to rotate the guide pin.

3. The guide pin of claim 1, wherein the bottom walls extends coplanar with and to flat sides formed in the guide pin body.

4. The guide pin of claim 1, wherein the stem is generally cylindrical having a stem diameter, the bottom walls being separated by a distance less than the stem diameter.

5. The guide pin of claim 1, wherein the stem is generally cylindrical having a stem diameter, the stem having at least two flat sides formed in the guide pin body being separated by a distance less than the stem diameter.

6. The guide pin of claim 1, wherein the slots extend at least partially along the tip.

7. The guide pin of claim 1, wherein the stem includes radiused portions aligned with the slots, the radiused portions being configured to engage the mounting block.

8. The guide pin of claim 1, wherein the lead-in starts at the end of the tip and extends outward to an outer perimeter of the guide pin body.

9. The guide pin of claim 1, wherein the tip is cone shaped and the stem is cylindrical shaped with the slots recessed into an outer surface of the stem.

10. The guide pin of claim 1, wherein the slots are open at a front of the guide pin body.

11. A connector assembly comprising:

a support frame having a cavity, the support frame having a threaded bore;

at least one connector received in the cavity; and a guide pin coupled to the support frame, the guide pin having a guide pin body extending along a pin axis, the guide pin body having a stem extending between a root and a tip, the root having threads threadably coupled to the threaded bore of the support frame, the tip being pointed to provide a with an end of the tip being less than half of a diameter of the stem of the guide pin body to guide the guide pin body into a mounting block, the stem having slots extending from the tip parallel to the pin axis, the slots have a bottom wall and side walls generally perpendicular to the bottom wall, the bottom wall being recessed below an outer perimeter of the guide pin body, wherein the slots are configured to receive ribs of a driver tool used to rotate the guide pin body to threadably couple the root to the threaded bore.

12. The connector assembly of claim 11, wherein the support frame includes at least one spacer and frame walls supported by the spacer and defining the cavity, the spacer having the threaded bore, the guide pin being threadably coupled to the spacer.

13. The connector assembly of claim 11, wherein the side walls define bearing surfaces for the driver tool to rotate the guide pin.

14. The connector assembly of claim 11, wherein the side walls and bottom wall are recessed below an outer surface of the guide pin body.

15. The connector assembly of claim 11, wherein the slots extend at least partially along the tip.

16. The connector assembly of claim 11, wherein the tip is cone shaped and the stem is cylindrical shaped with the slots recessed into an outer surface of the stem.

17. The connector assembly of claim 11, wherein the slots are open at a front of the guide pin body.

18. A cable backplane system comprising:

a backplane having a plurality of openings therethrough, the backplane having mounting blocks proximate the openings; and a cable rack coupled to a rear of the backplane, the cable rack comprising:

a tray having frame walls surrounding a raceway;

cable connector assemblies supported by corresponding frame walls, each cable connector assembly having a support frame defining a cavity, the support frame having spacers with threaded bores, each cable connector assembly having at least one cable connector received in the cavity, each cable connector having a plurality of cables extending therefrom into the raceway, each cable connector being received in a corresponding opening in the backplane and held in position relative to the backplane by the support frame; and a plurality of guide pins coupled to corresponding spacers, each guide pin having a guide pin body extending along a pin axis, the guide pin body having a stem extending between a root and a tip, the root having threads threadably coupled to the corresponding threaded bore, the tip being pointed to provide a lead-in with an end of the tip being less than half of a diameter of the stem of the guide pin body to guide the guide pin body into the mounting block, the stem having slots extending from the tip parallel to the pin axis to an intermediate position along the guide pin body remote from the tip, the slots have a bottom wall and side walls generally perpendicular to the bottom wall, the bottom wall being recessed below an outer perimeter of the guide pin body, wherein the slots are configured to receive ribs of a driver tool used to rotate the guide pin body to threadably couple the root to the threaded bore.

* * * * *